Patented Mar. 17, 1931

1,796,972

UNITED STATES PATENT OFFICE

GEORGE STAFFORD WHITBY, OF MONTREAL, QUEBEC, CANADA, ASSIGNOR, BY MESNE ASSIGNMENTS, TO THE ROESSLER & HASSLACHER CHEMICAL COMPANY, A CORPORATION OF DELAWARE

METHOD FOR THE MANUFACTURE OF MONOXANTHOGENS

No Drawing. Application filed May 17, 1928. Serial No. 278,623.

This invention has for its object the manufacture of organic monosulfide compounds or monoxanthogens which may be represented by the general formula,

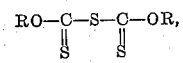

wherein the group RO— is the radical of any aliphatic alcohol or derivative thereof capable of yielding a xanthate and wherein R is of a non-cyclic nature. I call the compounds having the above general formula by the name of aliphatic monoxanthogens because of their similarity in structure to the dixanthogens which are represented by the general formula.

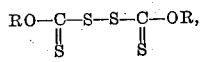

Heretofore, the only aliphatic monoxanthogen which has been prepared was the ethyl derivative represented by the formula:

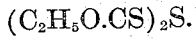

This compound was prepared by H. Welde (Berichte 9, (1876) p. 1044) by complex reactions unsuitable for industrial purposes and requiring comparatively expensive chemicals. Moreover, poor yields were obtained, so that no practical process existed up to the time of my invention for the economical manufacture of aliphatic monoxanthogens.

I have now found that aliphatic monoxanthogens of the general formula given above can be prepared cheaply and in excellent yield by reacting alkali metal cyanides with the corresponding disulfide compounds according to reactions, which may be expressed as follows:

where M is an alkali metal. The disulfides used in this reaction are the dixanthogens mentioned above, and may be prepared by a variety of methods, such as: electrolysis of concentrated xanthate solutions, action of iodine with potassium iodide on a xanthate solution, etc. I prefer, however, to use dixanthogens as prepared through the action of an alkali metal hypochlorite on a xanthate.

In carrying out the reaction of my invention, I have found that the dixanthogen and alkali metal cyanide may be reacted to produce good yields under a variety of conditions, as for example, dissolving and/or suspending them in a liquid or liquid mixtures such as water, alcohol, acetone, organic solvents, etc. which are inert to or do not enter into undesirable reactions with the cyanide or the mono- or dixanthogen. The dixanthogen and cyanide are preferably used in the proportion of about one mole of each. In this way I have prepared many new members of the class of aliphatic monoxanthogens as well as the previously known ethyl derivative. Among the new members which I have prepared by my invention, the n-propyl, n-butyl, isobutyl, isoamyl and n-hexyl derivatives were found to be yellow oils, while the methyl derivative was in the form of yellow needles melting at 55° C. The monoxanthogens prepared from a mixture of higher alcohols (corresponding in mean molecular weight to decyl alcohol) as well as from the monoethyl ether of ethylene glycol, by way of the corresponding xanthates and dixanthogens, were also yellow oils.

As products of my invention, I have found that those monoxanthogens in which R—O—, of the formula R—O—CS.S.CS—O—R is a secondary aliphatic alcohol radical, form a new sub-group or class of compounds which have proved of great value as accelerators of the vulcanization of rubber. This class of compounds I call generically, secondary alkyl monoxanthogens. As an example of this group I have prepared the isopropyl derivative, or isopropyl monoxanthogen, which is a golden yellow crystalline solid melting at 54–55° C.

A few examples which illustrate my invention are as follows:

*Example I*

67.5 grams of isopropyl dixanthogen melting at 57° to 58° C. were dissolved in 250 cc. of acetone. A solution of 13 grams of egg sodium cyanide (96 to 98%) in 25 cc. of water was gradually added with agitation of the mixture over a period of 40 minutes. The temperature of the mixture was kept below 8° C. for 1½ hours after adding all the cyanide and while stirring. Finally the reaction mixture was stirred for 1½ hours at about 16° C. and then filtered. The cake, after washing out with water to remove practically all sulfocyanide, was dried and amounted to 38 grams of monosulfide melting at 49-54° C. The recrystallized and purified isopropyl monoxanthogen is in the form of yellow crystals melting at 52-54° C. The filtrate of 270 cc. was treated with water, cooled, filtered, and the residue washed with water and dried in the air. The additional monoxanthogen thus obtained amounted to 21.2 grams melting at 38-41° C. The filtrate and wash waters were combined, diluted to 1 liter, and analyzed for sodium cyanide and sulfocyanide.

Total weight of crude isopropyl monoxanthogen crystals:
 59.2 grams (99.5% yield)
Total NaCN: 0.05 grams
Total NaSCN: 19.28 gms. (93% yield)

This example shows dilution of the filtrate from the reaction liquid with water in order to precipitate the remaining monoxanthogen. An improvement over this example is to dilute the whole reaction liquid with water upon completion of the reaction and then filter it to separate all of the crude monoxanthogen in one step. Further cooling of the reaction liquid also aids in precipitating monoxanthogen. The acetone may be recovered from the wash waters by distillation or salting out.

When preparing the monoxanthogen of Example I with alcohol for a solvent, as little as 12 cc. of the latter to 10 gms. of the isopropyl di-xanthogen may be used. To these amounts of alcohol and monosulfide, 1.9 gms. of NaCN in 2.5 gms. of water diluted with 2 cc. of alcohol may be added gradually and while cooling at about 45° C. When the reaction mixture is cooled the monoxanthogen separates either as crystals or as an oil which will crystallize upon "seeding" with a small crystal.

*Example II*

121 gms. of ethyl dixanthogen were dissolved in 1500 cc. alcohol, the solution was kept below 50° C. by cooling externally with ice water, and there was added gradually with mechanical stirring a solution of one equivalent of KCN dissolved in the minimum of water and diluted with an equal volume of alcohol. The temperature was allowed to rise gradually to that of the room while stirring. Water was added and the crude product collected. Yield—73 grams or 70%. The product recrystallized from alcohol showed a melting point of 52° C.

I do not wish my invention to be limited to the above examples, since other variations of the same are possible.

Claims:
1. A new composition of matter consisting of a secondary alkyl monoxanthogen.
2. A new composition of matter consisting of isopropyl monoxanthogen.

Signed at Perth Amboy, in the county of Middlesex and State of New Jersey this fifteenth day of May A. D. 1928.

GEORGE STAFFORD WHITBY.